United States Patent [19]

Smith

[11] 4,401,608

[45] Aug. 30, 1983

[54] METHOD FOR ENLARGING GRAIN SIZE OF URANIUM OXIDE

[75] Inventor: Peter C. Smith, Wilmington, N.C.

[73] Assignee: General Electric Company, San Jose, Calif.

[21] Appl. No.: 310,619

[22] Filed: Oct. 13, 1981

[51] Int. Cl.³ .............................................. G21C 21/00
[52] U.S. Cl. .................... 264/0.5; 252/638; 252/643; 423/261
[58] Field of Search ................ 264/0.5; 252/638, 643; 423/261

[56] References Cited

U.S. PATENT DOCUMENTS

| | | | |
|---|---|---|---|
| 3,761,547 | 9/1973 | Grossman | 264/0.5 |
| 3,803,273 | 4/1974 | Hill et al. | 264/0.5 |
| 3,883,623 | 5/1975 | Lay | 264/0.5 |
| 3,923,933 | 12/1975 | Lay | 264/0.5 |
| 4,061,700 | 12/1977 | Gallivan | 264/0.5 |
| 4,152,395 | 5/1979 | Börner et al. | 423/261 |
| 4,314,952 | 2/1982 | Zawidzki | 264/0.5 |

FOREIGN PATENT DOCUMENTS

| | | | |
|---|---|---|---|
| 1204210 | 11/1965 | Fed. Rep. of Germany | 423/261 |
| 47-36157 | 11/1972 | Japan | 423/261 |

*Primary Examiner*—Leland A. Sebastian
*Attorney, Agent, or Firm*—Ivor J. James, Jr.; Raymond G. Simkins; Samuel E. Turner

[57] ABSTRACT

The grain size of particulate uranium oxides is increased and adjusted by the application thereto of hydrogen peroxide. The procedure is useful in the manufacture of nuclear reactor fuel from powdered fissionable materials.

8 Claims, No Drawings

METHOD FOR ENLARGING GRAIN SIZE OF URANIUM OXIDE

BACKGROUND OF THE INVENTION

This invention generally relates to methods of producing fuel for nuclear reactors wherein particulate uranium oxides are formed into pellets or integrated fuel units. The invention particularly relates to means for increasing the grain size of the particulate uranium oxide materials used in producing fuel by such methods.

The grain size of fissionable ceramic materials used in nuclear reactor fuels has been an important factor in the manufacture and the performance of nuclear reactor fuels. For instance, U.S. Pat. No. 3,883,623 proposes that particle size of ceramic uranium materials has an effect upon the density of fuel produced by sintering such particles, and discloses the significance of density in fuel products. On the other hand, U.S. Pat. No. 3,803,273 discloses an effect of the grain size in sintered composites or pellets of particulate fuel materials upon the performance of fuel elements in reactor service. In any case, it appears that grain size of fuel stocks influences significant aspects of fissionable ceramic fuels for nuclear reactors and therefore that the particle size contents or manipulation of this property of uranium oxide for use as fuel is of considerable consequence.

The manufacturing of ceramic fissionable fuel from powdered oxides of uranium is well known in the art, note for example U.S. Pat. Nos. 3,761,547; 3,803,273; 3,883,623; and 4,061,700, and the references cited therein. The disclosures of these patents showing the state of the art in this field are accordingly incorporated herein by reference.

Briefly, the manufacture of such ceramic fissionable fuel typically comprises cold pressing fine powdered oxides of uranium, either alone or admixed with other fissionable materials, into green coherent compacts or bodies such as pellets, and then sintering the green compacts of oxide powder to fuse the particles into an integrated mass.

Uranium dioxide is the principal source of fissionable fuel for commercial power generating nuclear reactors. Commercially available uranium dioxide is of a relatively fine particulate form comprising small particles or powder typically ranging up to about 10 to 15 microns in size, but averaging near 0.5 microns in size with no practical limit on the smaller sizes. The sintering operation typically increases grain size to a particle of about 20 microns. This relatively small particle size of commercial sources of the principal fuel material constitutes a marked disadvantage in the common fuel manufacturing process wherein large grain size is generally desired or beneficial, in addition to particle size having a significant influence upon other facets of the process or product thereof.

SUMMARY OF THE INVENTION

This invention comprises a method for enlarging the grain size of sintered uranium oxide in the manufacture of fissionable nuclear fuel. Increased grain size of uranium oxide materials in this invention is attained by adding hydrogen perioxide solution to the particulate uranium oxide and dispersing it therethrough prior to consolidation and sintering.

OBJECTS OF THE INVENTION

It is the primary object of this invention to increase the grain size of powdered uranium oxide in the manufacture of fissionable nuclear fuel for nuclear reactor service.

It is also a primary object of this invention to provide an improved process of manufacturing fissionable nuclear fuel for nuclear reactors comprising pressing powdered oxides of uranium into green coherent compacts and sintering the compacts.

It is a further object of this invention to provide a means for adjusting the physical properties of fissionable ceramic nuclear fuel to enhance the manufacture and service of such fuel products.

It is another object of this invention to control porosity and in turn density of ceramic fissionable nuclear fuel products by manipulating the grain size of fissionable powdered materials.

DETAILED DESCRIPTION OF THE INVENTION

In the practice of this invention the particulate fissionable ceramic fuel material, or source thereof, comprises oxides of uranium either alone or mixed with other materials. Fuel admixtures for the invention comprise combinations of uranium oxides with other sources of fissionable materials including oxides of thorium and plutonium, and with non-fuel materials such as gadolinium as a high neutron absorbant for neutron flux control, sometimes referred to as a burnable "poison", or neutron "parasite".

As indicated hereinbefore, commercial sources of uranium oxide of fissionable reactor fuel grade are relatively fine powders, comprising particles essentially sized smaller than about 10 to 15 microns.

According to this invention, an additive comprising an aqueous solution of hydrogen peroxide is admixed with the dry, particulate ceramic fissionable fuel material comprising uranium oxide prior to pressing the discrete particles into green compacts or pellets for sintering. The hydrogen peroxide solution additive can be included and admixed with the particulate fissionable fuel material in effective amounts ranging up to about 5 weight percent of hydrogen peroxide, with about 1 to about 3 weight percent thereof suitable for most embodiments of the invention. However, the amounts of hydrogen peroxide solution introduced can be varied or adjusted to produce a desired grain size.

Solutions of the hydrogen peroxide additive can be of any concentration conveniently available and readily admixable with the discrete particulate solids of the fuel material. Typical and suitably applicable concentrations comprise about 10 to about 50 percent of hydrogen peroxide, with approximately 30 percent preferred.

Admixing of the aqueous solution of hydrogen peroxide additive with the discrete dry particles of the fuel materials can be carried out with any blending system or apparatus suitable for dispersing a relatively small quantity of liquid through a relatively large quantity or mass of discrete particles. One preferred means for effectively achieving a rapid and relatively even dispersion of the hydrogen peroxide solution through the particulate mass comprises applying a spray of finely atomized solution on to a moving mass of the particles and continuing the movement of the particles until the solution is dispersed therethrough. The application of a grinding media will enhance homogenization. In a typical embodiment of this invention the hydrogen peroxide solution is sprayed onto a vibrating and mixing body of powdered uranium dioxide in a vibratory mill with the tumble mixing action continued until substantial homogeneity is achieved.

Subsequent tumbling, rolling or other blending movement of the admixed dry powder uranium dioxide with the hydrogen peroxide solution therein tends to cause an agglomeration or an accretion growth of the particles into larger bodies.

After adding and dispersing the hydrogen peroxide solution through the discrete particles comprising uranium oxide, the resultant particulate mixture is processed in a conventional manner for the manufacture of nuclear fuel such as described in the aforementioned patents. For instance, the particulate mixture, including the hydrogen peroxide solution, is dry pressed to produce green or unfired compacts or pellets. Thereafter the green compacts or pellets of particles are sintered to fuse the same into an essentially continuous or integrated mass suitable for use as fissionable fuel in a nuclear reactor.

As an example of a preferred embodiment of this invention, a batch of powdered uranium dioxide having an average particle size of about 0.5 microns, as determined by microscopy and surface area measurements, was agitated in vibratory mill. A solution of 30 percent hydrogen peroxide in water was applied as a fine mist to the vibrating uranium dioxide powder in an amount of 2 weight percent. The vibratory milling was carried out for 30 minutes. The blended powder was pelleted and then sintered under typical conditions, namely, for 4 hours at 1780° C. in a wet hydrogen atmosphere. The resulting sintered pellets had grain sizes up to about 100 microns, compared to grain sizes up to about 15 microns for the same uranium dioxide processed in a normal manner, that is, in an identical process but without the hydrogen perioxide solution addition.

I claim:

1. A method of enlarging the grain size of sintered uranium oxide in the manufacture of fissionable nuclear fuel, comprising the steps of:
   (a) adding a solution of hydrogen peroxide in amounts of up to about 5 weight percent to solid powdered uranium oxide and mixing the hydrogen peroxide solution through the solid powdered uranium oxide;
   (b) pressing the powdered uranium oxide with the hydrogen peroxide solution mixed therethrough into green coherent bodies; and
   (c) sintering the green coherent bodies of powdered uranium oxide to affect the grain growth.

2. The method of claim 1, wherein the solution of hydrogen peroxide is added to the powdered uranium oxide in amounts of about 1 to about 3 weight percent.

3. The method of claim 1, wherein the solution of hydrogen peroxide added to the powdered uranium oxide is an aqueous solution of about 10 to about 50 percent hydrogen peroxide.

4. A method of enlarging the grain size of sintered uranium oxide in the manufacture of fissionable nuclear fuel, comprising the steps of:
   (a) adding an aqueous solution of hydrogen peroxide in amounts of about 1 to about 5 weight percent to solid powdered uranium dioxide and mixing the hydrogen peroxide solution through the solid powdered uranium dioxide;
   (b) cold pressing the powdered uranium dioxide with the hydrogen peroxide solution mixed therethrough into green coherent pellets; and
   (c) sintering the green coherent pellets of powdered uranium oxide.

5. The method of claim 4, wherein the solution of hydrogen peroxide is added to the powdered uranium dioxide by applying a finely atomized spray of the solution to a moving mass of the powder.

6. A method of enlarging the grain size of sintered uranium oxide in the manufacture of fissionable nuclear fuel, comprising the steps of:
   (a) spraying a finely atomized aqueous solution of hydrogen peroxide in amounts of about 1 to about 3 weight percent onto a moving mass of solid powdered uranium dioxide and mixing the hydrogen peroxide solution through the solid powdered uranium dioxide;
   (b) cold pressing the powdered uranium dioxide with the hydrogen peroxide solution mixed therethrough into green coherent pellets; and
   (c) sintering the green coherent pellets of powdered uranium dioxide.

7. The method of claim 6, wherein the solution of hydrogen peroxide sprayed on the powdered uranium dioxide is an aqueous solution of about 10 to about 50 percent hydrogen peroxide.

8. The method of claim 6, wherein the solution of hydrogen peroxide sprayed on the powdered uranium dioxide is in amount of about 2 weight percent.

* * * * *